US012340714B2

(12) United States Patent
Smith

(10) Patent No.: US 12,340,714 B2
(45) Date of Patent: Jun. 24, 2025

(54) PORTABLE LED SIGN CABINET

(71) Applicant: KEYSTONE TECHNOLOGIES, LLC, Lansdale, PA (US)

(72) Inventor: Evan Michael Smith, Lansdale, PA (US)

(73) Assignee: Keystone Technologies, LLC, Lansdale, PA (US)

( * ) Notice: Subject to any disclaimer, the term of this patent is extended or adjusted under 35 U.S.C. 154(b) by 138 days.

(21) Appl. No.: 18/069,696

(22) Filed: Dec. 21, 2022

(65) Prior Publication Data

US 2024/0212531 A1 Jun. 27, 2024

(51) Int. Cl.
*G09F 13/04* (2006.01)

(52) U.S. Cl.
CPC ...... *G09F 13/0448* (2021.05); *G09F 13/0413* (2013.01); *G09F 13/0458* (2021.05); *G09F 13/0463* (2021.05)

(58) Field of Classification Search
CPC ............. G09F 13/0448; G09F 13/0463; G09F 13/0458; G09F 13/0413
See application file for complete search history.

(56) References Cited

U.S. PATENT DOCUMENTS 5,347,736 A * 9/1994 Kanigan ................. G09F 13/04 362/812
6,857,212 B2 2/2005 Velez
7,942,542 B1 5/2011 Dunn
8,534,960 B2 9/2013 Chen
9,648,672 B2 5/2017 Chien
10,909,890 B1 * 2/2021 Apostle ............... G09F 13/0445
2004/0074129 A1 4/2004 Carlson
2007/0086193 A1 4/2007 Chen
2009/0207608 A1 8/2009 Graham
2010/0199533 A1 8/2010 Tsai
2012/0020112 A1 1/2012 Fisher et al.
2012/0324771 A1 * 12/2012 Safavi ..................... F21V 21/00 361/747
2014/0007474 A1 * 1/2014 Varveris ............... A47G 1/0616 40/714
2014/0218919 A1 * 8/2014 Han .......................... F21V 5/04 362/240
2014/0268785 A1 * 9/2014 Quaal ...................... G09F 13/04 362/249.08
2015/0228211 A1 * 8/2015 Curic ...................... G09F 13/10 40/541
2018/0317330 A1 * 11/2018 Dunn .................. G02F 1/13338
2019/0012940 A1 * 1/2019 Hinton .................... G09F 27/00
2019/0278095 A1 * 9/2019 Pan ....................... F21V 15/012
2019/0385493 A1 12/2019 Lei
2020/0349871 A1 * 11/2020 Zhao ....................... G09F 13/18
(Continued)

FOREIGN PATENT DOCUMENTS

EP 3723074 A1 10/2020

*Primary Examiner* — Gary C Hoge
(74) *Attorney, Agent, or Firm* — The Dobrusin Law Firm, PC

(57) ABSTRACT

A sign cabinet, comprising: (a) a frame adapted to receive and support one or more graphics, the frame having sections defining a perimeter of the frame; and (b) a light assembly housed within the frame and adapted to illuminate the one or more graphics when located within the frame; wherein the frame is adapted for freestanding and suspended hanging.

19 Claims, 7 Drawing Sheets

(56) References Cited

U.S. PATENT DOCUMENTS

| | | | | |
|---|---|---|---|---|
| 2022/0235923 | A1* | 7/2022 | Cheng | F21V 17/12 |
| 2023/0103042 | A1* | 3/2023 | Wojohn | G09F 7/18<br>40/546 |
| 2024/0096247 | A1* | 3/2024 | Dunn | G09F 13/0413 |

* cited by examiner

PORTABLE LED SIGN CABINET

FIELD

The present teachings generally relate to a sign cabinet, and more particularly, a sign cabinet adapted for hanging and/or freestanding.

BACKGROUND

It is often desirable to display one or more graphics in a public setting. These graphics may provide visual or textual details information about a specific or service being promoted by a company. For example, graphics are frequently displayed to promote or portray cinema releases, product releases, retail store sales, company services, and other similar information. Similarly, at various industry shows, companies may often set up a display are to promote their products, technology, services, or a combination thereof.

To ensure visibility of the aforementioned graphics—such as in dimly lit areas, in various lighting conditions within buildings, in outdoor settings with varying exposure to sunlight, etc.—it is often desirable to use one or more illuminated sign cabinets. The graphics may be attached to or otherwise positioned adjacent to the illuminated sign cabinet so that a lighting system located within the cabinet generates a light that may be diffused around and/or through the graphics. Frequently, these types of cabinets include one or more incandescent lamps, one or more fluorescent lamps, or both.

While many other industries have substantially or entirely eliminated the use of incandescent and/or fluorescent lamps in exchange for more energy efficient light emitting diodes (LED), lighting systems for graphics such as those mentioned above may often be unable to incorporate LEDs. LED lightings systems may be unable to provide a sufficient light angle to properly illuminate a graphic. As a result, the LED lighting system may provide inconsistent illumination, where portions of the graphic may still remain dark. Additionally, due to the structure of LED lighting systems, it may often be complicated or difficult to provide a solution to the above LED lighting system defects pertaining to illuminating graphics. Furthermore, to provide such a solution may also significantly increase manufacturing and/or product costs.

Moreover, due at least in part to the use of conventional lighting systems having incandescent and/or fluorescent lamps, sign cabinets may often be structurally rigid and difficult to mount and/or maneuver. As a result, displays using the sign cabinets may frequently be rigid or stationary once set up and may require significant installation time.

Thus, based on the above, it may be desirable to have a sign cabinet that successfully incorporates an LED light assembly without a drop in performance when compared to conventional sign cabinets utilizing incandescent and/or fluorescent lamps. What is needed is a sign cabinet having one or more LED light assemblies that provide sufficient illumination of one or more graphics located within the sign cabinet without having darkened areas. Moreover, it may be desirable to have a sign cabinet that provides movable and/or customizable display configurations. Thus, what is needed is a sign cabinet that provides a removable base to facilitate both freestanding setup of the sign cabinet and suspended hanging.

SUMMARY

The present teachings meet one or more of the present needs by providing a sign cabinet, comprising: (a) a frame adapted to receive and support one or more graphics, the frame having sections defining a perimeter of the frame; and (b) a light assembly housed within the frame and adapted to illuminate the one or more graphics when located within the frame; wherein the frame is adapted for freestanding and suspended hanging.

The sign cabinet may include a first light assembly abutting a second light assembly, and the first light assembly may illuminate a first side of the frame while the second light assembly may illuminate an opposing second side of the frame. The frame may be adapted to receive and support a first graphic on the first of the frame and a second graphic on the second side of the frame.

Each light assembly of the sign cabinet may comprise: (a) a body; (b) a light module having one or more light emitting diodes (LEDs) disposed in a grid-like pattern and contained within the body; and (c) a diffuser located adjacent to the light module, wherein the diffuser may be adapted to abut the one or more graphics and diffuse light emitted from the light module to illuminate the one or more graphics. A body of the first light assembly may abut a body of the second light assembly so that a diffuser of the first light assembly may be free of contact with a diffuser of the second light assembly. Each light assembly of the sign cabinet may include a driver in communication with the light module. The first light assembly and the second light assembly may be secured to one another by a tie bracket. The body of the first light assembly and the body of the second light assembly may be fully contained within the confines of the frame of the sign cabinet.

The one or more sections may be detachable from the frame to provide an opening for inserting the one or more graphics into the frame. The frame may include a bracket around the perimeter of the frame adapted to secure a cord for hanging the sign cabinet. The sign cabinet may include a removable base having a receiving portion that receives the sign cabinet and facilitates freestanding of the sign cabinet. The base may include a platform extending substantially transverse from the sign cabinet, and the platform may include one or more casters. The receiving portion may project from and extend substantially transverse from the platform to receive the sign cabinet. Additionally, the frame of the sign cabinet may be supported by a support located within a cavity of the receiving portion, and the frame may be secured to the receiving portion by one or more fasteners. The support of the receiving portion may include a recess that receives the bracket of the frame. The sign cabinet may also include a wire that is adapted to receive power from a power outlet, and the wire may extend from the frame of the sign cabinet in a location that is free of contact with the base when the sign cabinet is inserted into the base. Furthermore, one or more of the sections may include a cutout having a perimeter that at least partially extends around the bracket located along the frame. One or more of the sections may be secured directly to the tie bracket. Additionally, the sign cabinet may be adapted for freestanding in a vertical position and suspended hanging in a horizontal position.

The present teachings may also meet one or more of the present needs by providing a sign cabinet, comprising: (a) a frame having removable sections defining a perimeter of the frame; (b) a first light assembly and an opposing second light assembly located within the perimeter of the frame and secured to one another by a tie bracket located within the frame, wherein the first light assembly is adapted to illuminate a first graphic located on a first side of the sign cabinet and the second light assembly is adapted to illuminate a second graphic on an opposing second side of the sign cabinet, the first graphic and the second graphic both being contained within the frame; wherein the sign cabinet includes a removable base to facilitate freestanding of the sign cabinet, and the sign cabinet also includes one or more brackets located along the frame to facilitate suspended hanging of the sign cabinet by one or more cords.

Furthermore, the present teachings may also meet one or more of the present needs by providing: a sign cabinet that successfully incorporates an LED light assembly without a drop in performance when compared to conventional sign cabinets utilizing incandescent and/or fluorescent lamps; a sign cabinet having one or more LED light assemblies that provide sufficient illumination of one or more graphics located within the sign cabinet without having darkened areas; a sign cabinet that provides movable and/or customizable display configurations; a sign cabinet that provides a removable base to facilitate both freestanding setup of the sign cabinet and suspended hanging; or a combination thereof.

DETAILED DESCRIPTION

Figure 1:
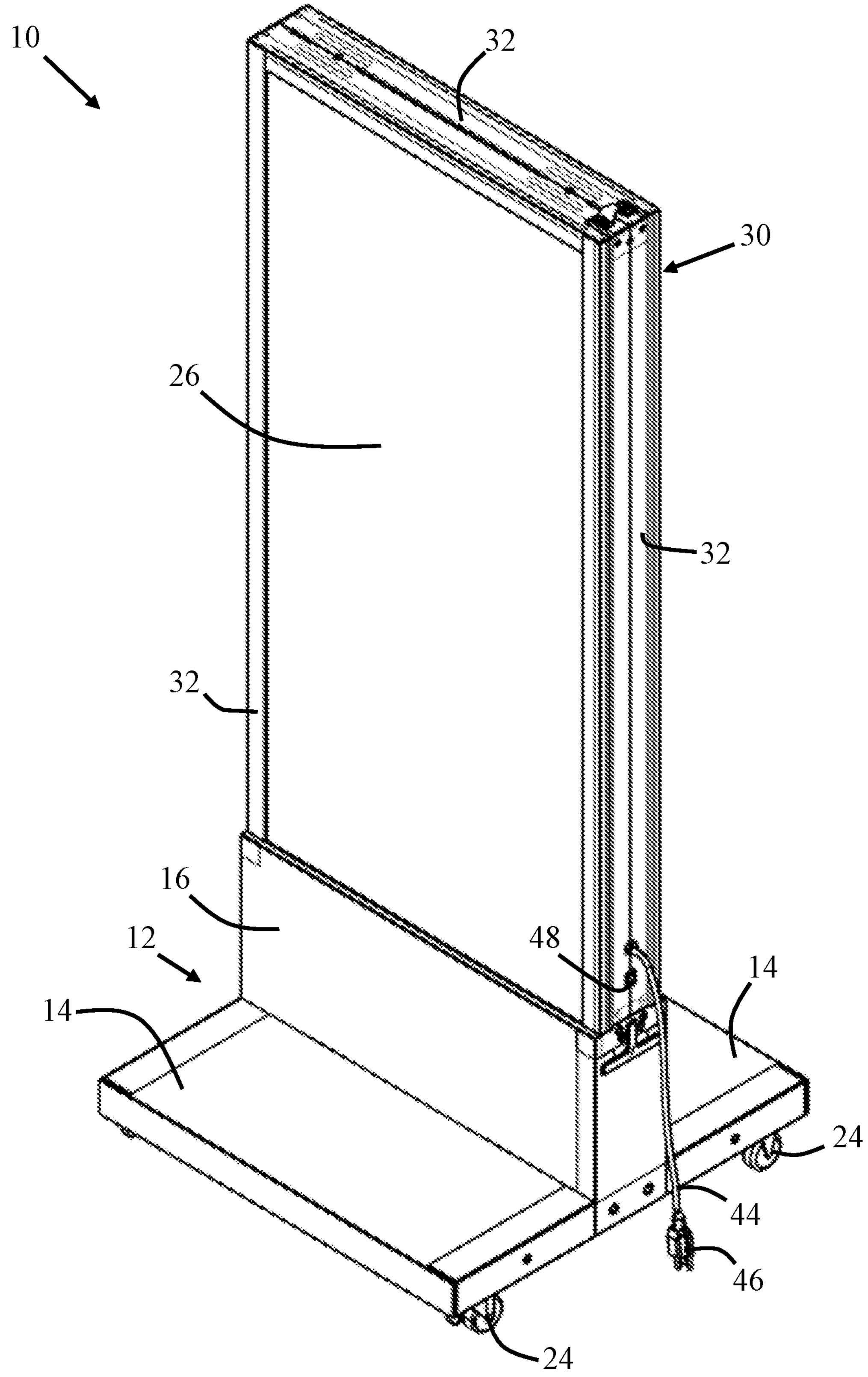
FIG. 1 is a perspective view of a sign cabinet in accordance with the present teachings.

The explanations and illustrations presented herein are intended to acquaint others skilled in the art with the invention, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference in their entirety for all purposes. Other combinations are also possible as will be gleaned from the following claims, which are also hereby incorporated by reference in their entirety into this written description.

The present generally relate to a sign cabinet. The sign cabinet may function to house and/or display one or more graphics. The sign cabinet may function to illuminate such graphics to provide a larger area of visualization for onlookers. The sign cabinet may illuminate the graphics by edge-lighting, back-lighting, front-lighting (e.g., from one or more lights directing light towards an outer surface of the graphic), or a combination thereof. As a result, graphics of the sign cabinet may be visible in a variety of conditions, such as outdoors, indoors with poor lighting conditions, etc.

The graphics located within the sign cabinet may function to illustrate or convey information. The information may be in the form of pictures, text, or both. The graphics as described herein are in no way limited to a particular industry or type of illustration. In other words, the sign cabinet herein may be adapted for use in a variety of industries, such as, but not limited to: the food and beverage industry; the construction industry; consumer product industry; home improvement industry; clothing industry; travel industry; transportation industry; other industries; or a combination thereof. As such, it may be gleaned from the present teachings that the sign cabinet as described herein may facilitate an effective manner of displaying one or more graphics in any number of circumstances (e.g., retail stores, trade shows, advertising displays, etc.).

The graphics may be adapted for proper illumination. While not limited to any particular material, it is envisioned that the graphics may be acrylic or otherwise at least partially transparent. As a result, the graphics may be backlit to illuminate the graphics outwardly without requiring an exposed or additional light located outside of the sign cabinet. However, the teachings herein in no way intend to limit the graphic medium, material, shape, size (e.g., thickness, width, height), or combination thereof.

The sign cabinet may include a frame. The frame may function to at least partially house or surround a graphic located within the sign cabinet. The frame may house one or more components of the sign cabinet therein, such as one or more light modules, cables, brackets, or a combination thereof. The frame may be any desired size and/or shape based on the needs of a particular graphic being used.

The frame may include one or more sections. The sections may function to at least partially define a perimeter or shape of the sign cabinet, and thus form a shape of the frame. The sections may function to define the confines of the sign cabinet that receive the one or more graphics. The sections may secure the graphics within the sign cabinet for proper illumination.

The sections may be a single, continuous section or may be a plurality of adjacent and/or interconnected sections. For example, each side of the sign cabinet may be a separate section.

The sections may include a lip or edge that facilitates securing of the graphic within the sign cabinet. The lip or edges of the sections may be adapted to extend at least partially inward toward a central region of the sign cabinet where the graphic may be displayed. As a result., the sections may prevent unwanted removal of the graphic. However, such lips or edges may not obstruct the graphic from being properly displayed.

The sections may include one or more cutouts. The cutouts may receive or otherwise provide an opening for one or more protrusions from the sign cabinet, such as one or more brackets or extensions of the sign cabinet. The cutouts may be located along a perimeter of the section or may be located centrally along the section (e.g., a hole therein). The cutouts may accommodate the one or more protrusions without disconnecting the plurality of sections that form the frame of the sign cabinet.

The sections may be secured to one or more structures of the sign cabinet. It is envisioned that the sections may be removably secured to the one or more structures of the sign cabinet. For example, the sections may be mounted to the sign cabinet using one or more fasteners, one or more adhesives, one or more mechanical interlocks, or a combination thereof. As a result, the sections may be individually or simultaneously removed to accommodate insertion and/or removal of the graphics. For example, the sign cabinet may include a plurality of interconnected sections. A single section may be removed to insert a new graphic and then resecured thereafter to prevent unwanted removal of the new graphic. As such, the sign cabinet may provide a quick and effective means to interchange graphics within the sign cabinet.

The sign cabinet may be adapted for freestanding display. Freestanding display of the sign cabinet may be facilitated by a base. The base may function to support the sign cabinet free of any secondary mounting or support structures. Therefore, a user may position the sign cabinet in any desired location without needing additional structures to properly hold the sign cabinet.

The base may include a receiving portion. The receiving portion may function to receive at least a portion of the sign cabinet. The receiving portion may support the sign cabinet to properly position the graphics located therein. The receiving portion may include an opening or cavity that allows for at least partial insertion of the sign cabinet into the base. For example, one or more of the sections, a portion of the graphic, or both, may be inserted into the opening or cavity of the receiving portion. However, it should be noted that such insertion would not obstruct the graphic for proper display.

The receiving portion may removably secure the sign cabinet. One or more fasteners, one or more adhesives, or both may secure the sign cabinet in and/or on the receiving portion to maintain a position of the sign cabinet relative to the base. Similarly, the receiving portion may be structurally rigid enough to withstand a load from the sign cabinet without degradation, unwanted flexing, or both. To improve structural integrity of the receiving portion, one or more strengthening beads, ribs, projections, gussets, or a combination thereof may be incorporated.

The receiving portion may include a planar portion that receives the sign cabinet to support the sign cabinet. The planar portion may be a surface of the receiving portion. However, to ensure a more rigid connection between the receiving portion and the sign cabinet, the receiving portion may include one or more supports.

The supports may be located within the opening or cavity of the receiving portion. The supports may dictate a height of the sign cabinet once properly inserted into the receiving portion. That is, the supports may define a depth in which the sign cabinet is inserted into the receiving portion for proper installation to the base. The supports may be welded, bonded, fastened, or otherwise secured within the receiving portion to properly abut the sign cabinet. For example, one or more sections of the sign cabinet may rest along the supports to properly secure the sign cabinet to the base. The support may be a single support or may a plurality of supports. For example, the receiving portion may include a pair of supports located at opposing sides of the receiving portion to support opposing sides of the sign cabinet once located into the receiving portion.

The supports may include a recess. As discussed in further detail below, one or more protrusions—such as a bracket or extension of the one or more sections—may be positioned to make contact with the support if a recess was not present. As a result, the sign cabinet may be improperly secured within the receiving portion, whereby the one or more protrusions may rest along the support and the sign cabinet is unable to be supported without rocking or movement caused by the one or more protrusions. To alleviate such issues, the supports may have a recess formed from a bump-out, channel, groove, or other feature formed in the recess that may receive the one or more protrusions while the remaining portions of the support receive the sign cabinet and support the sign cabinet in a flush manner (i.e., without rocking or unwanted movement). The one or more protrusions received by the recess may be free of contact with the support or walls of the recess to properly seat the sign cabinet within the receiving portion.

The receiving portion may be connected to one or more platforms of the base. The receiving portion may extend or otherwise project from the one or more platforms of the base to secure the sign cabinet. The receiving portion may be integrally (i.e., monolithically) formed with the base or may be secured to the base as a separate component.

The platform or platforms of the base may function to provide additional support and stability to the base. The platforms may extend to allow for movement of the base when the sign cabinet is installed therein. For example, the platform or platforms may be connected to one or more wheels to allow for easily moving the base to a desired location for display of the sign cabinet. Additionally, given that the platform may extend or be connected to the receiving portion, the platform may be free of contact with the sign cabinet located within the receiving portion, thereby preventing unwanted obstruction of the graphic located therein.

Advantageously, the sign cabinet may also allow for various display configurations. As stated above, the sign cabinet may allow for freestanding display with the use of a base. Additionally, the sign cabinet may also accommodate suspended hanging by securing the sign cabinet to one or more structures, such as a beam, ceiling, roof, overhang, etc. In such a case, the sign cabinet may be easily removed from the base and secured to one or more mounts along the secondary structure. To secure the sign cabinet, one or more cords may extend from the structure and fasten to the sign cabinet.

In particular, the sign cabinet may include one or more brackets. The brackets may receive the one or more cords or a connecting device of the cord. The brackets may include an opening or loop that allows for the cord to be tied or connected to the bracket. For example, the one or more cords may include a clip (e.g., a carabiner clip) that clips to the bracket of the sign cabinet. To accommodate the suspending hanging of the sign cabinet, a plurality of brackets may be located along the sign cabinet. The brackets may be positioned along one or more sections, along a perimeter of the sign cabinet free of contact with the one or more sections, or both. The brackets may facilitate both vertical and/or suspended hanging. A vertical position of the sign cabinet may be defined as an upright position, whereby a height of the sign cabinet is greater than a width. The height may be measured along one or more of the sections that extend substantially orthogonal to the ground. Conversely, a horizontal position of the sign cabinet may be defined as a position where a height of the sign (e.g., as measured along the substantially orthogonal sections relative to the ground) is less than a width. In other words, the brackets and/or the base may facilitate both positions of the sign cabinet, or one or more positions therebetween to further customize the use of the sign cabinet.

As discussed above, the sign cabinet may illuminate one or more graphics located therein. To do so, the sign cabinet may include one or more light assemblies. The light assemblies may function to provide a light source to illuminate the graphics. The lights assemblies may function to effectively illuminate the graphics free of any darkened or inconsistently illuminated regions of the graphic. The light assemblies may be located within the sign cabinet adjacent to the graphics. The light assemblies may be entirely or partially contained within the sign cabinet. That is, the light assemblies may be contained with a perimeter formed by the frame (e.g., the sections) of the sign cabinet.

The sign cabinet may include a plurality of light assemblies. The light assemblies may be positioned to illuminate a single side of the sign cabinet (e.g., to illuminate one or more graphics located on a single side of the sign cabinet). However, advantageously, the light assemblies may be configured to abut one another in a manner that allows the light assemblies to illuminate opposing sides of the sign cabinet. In other words, the light assemblies may provide a two-sided sign cabinet, whereby opposing sides of the sign cabinet each include a graphic that may be illuminated by the light assemblies. For example, a first light assembly may illuminate a first side of the sign cabinet containing a first graphic while a second light assembly may illuminate a second side of the sign cabinet containing a second graphic. As a result, the sign cabinet may expand the area of view.

The light assemblies may illuminate the one or more graphics using edge-lighting techniques. However, it may be particularly beneficial to backlight the one or more graphics via the light assemblies to more effectively illuminate an entirety of the one or more graphics. The backlighting may be made possible using one or more light emitting diodes (LEDs). While conventional sign cabinets may incorporate one or more incandescent and/or fluorescent lamps to for illumination, the present teachings may provide a means of utilizing LEDs without sacrificing the power of the light assemblies. As a result, the light assemblies may still effectively illuminate the graphics while substantially decreasing the overall power consumption of the light assemblies.

The light assemblies may include a body. The body may function to house one or more light modules therein. The body may function as a structural support for the light assemblies so that the body may be mounted to the sign cabinet in a desired location. The body may be a housing or shell that is partially or fully enclosed. However, the body may still allow for light from the light modules therein to project out of the body towards the graphics.

A perimeter of the body of the light assembly may be at least partially surrounded by a frame. The frame may establish an overall shape of the light assembly. The frame may secure a diffuser to the body to properly diffuse light coming from the light module. The frame may be a bezel that secures the diffuser. The frame may be one or more pieces (e.g., sections) similar to those of the sign cabinet. The frame secures the diffuser to the body to create a seal therebetween and substantially prevent moisture and/or debris from reaching the light modules within the body.

The diffuser located adjacent to the frame may function to effectively diffuse light from the light module evenly along a backside of the graphics. The graphics may be positioned adjacent to the diffuser or may even abut a surface of the diffuser. The diffuser may be a variety or materials that facilitates diffusion of the light emitting from the light module. The diffuser may be at least partially transparent to allow for the light to reach the graphic.

The light module of the light assembly may function as a light source for illuminating the one or more graphics located within the sign cabinet. The light module may include one or more interconnected lights to provide the light source. The one or more interconnected lights may be incandescent lights, fluorescent lights, or both. The one or more interconnected lights may be individual light emitting diodes (LEDs). As such, the light module may decrease overall power usage of the light module while still maintaining a sufficient light source for even surface illumination of the one or more graphics.

The LEDs of the light module may be interconnected along a medium or substrate. The medium or substrate may form an overall shape of the light module. The medium or substrate may provide a support for the LEDs, one or more wires interconnecting the LEDs, or both. The medium or substrate may provide a structure for mounting or otherwise securing the light module to the body of the light assembly. The medium or substrate may span substantially the same or similar surface area to the surface area of the diffuser, the one or more graphics located adjacent to the diffuser, or both. However, it is envisioned that in particular cases, it may beneficial to have a light module having a surface area greater than the diffuser and/or graphics, a light module having a surface area smaller than the diffuser and/or graphics, or both. That is, in certain applications, adjusting the overall size of the light module may adjust the illumination of the graphics located within the sign cabinet. Such adjustment in size of the light module may modify the number of LEDs located therein or may only adjust the size of the medium or substrate without changing the number of LEDs.

The light module may be controlled by a driver. The driver may be positioned within or along the light assembly. The driver may be integrally formed or otherwise connected to the light module. As a result, all or a portion of the driver may be contained within the base of the light assembly to minimize packaging space. However, it is envisioned that the driver may still be accessible to a user if needed.

The driver may adjust may control and/or adjust the power received by the light module. That is, the driver may receive an input through a wire plugged into or wired to an external power source and adjust the power output of the light module based on the external power input. The input from an external power source may be 120 volts or 240 volts (e.g., a conventional power outlet). Advantageously, the light module via the driver may be powered using a two- or three-prong plug connected to wiring of the sign cabinet, whereby the wiring provides power to the light module through the driver.

Based on the input power received, the driver may control the power to each of the LEDs located within the light module. Thus, the one or more LEDs may have an output power of about 2 watts (W) or more, about 5 W or more, or about 12 W or more. The one or more LEDs may have an output power of about 20 W or less, about 17 W or less, or about 14 W or less. However, it is envisioned that the driver may facilitate various power outputs based upon a given application and electrical circuit. Similarly, the driver may control the overall power to a light module as a whole. The light module may have an output power or about 20 W or more, about 40 W or more, or about 50 W or more. The light module may have an output power of about 100 W or less, about 80 W or less, or about 70 W or less.

The driver may also control a color temperature of the light module or LEDs therein. The driver may provide one or more selectable correlated color temperature (CCT) settings or may automatically dictate a single color temperature of the light module. The specific color temperature (e.g., color) output of the LEDs of the light module may be measured in Kelvin (K). The LEDs may have a CCT of about 2,000K or more, about 3,000K or more, or about 4,500K or more. The LEDs may have a CCT of about 8,000K or less, about 6,500K or less, or about 5,000K or less. Thus, it may be gleaned from the present teachings that the one or more LEDs may be adjustable to a variety of CCT settings.

Advantageously, the driver and/or the light module may be wired to wiring of the sign cabinet (e.g., input power wiring connected to an external power source) through one or more junction cabinets. The junction cabinets may be located along the body of the light assembly adjacent to the drive. The junction cabinets may provide an easy access box to access wiring connected to the driver so that the driver—and thus the light module—may be easily wired to the wiring of the sign cabinet. As a result, each light assembly (e.g., the light frame, body, light module, diffuser, driver) may be a standalone light assembly that may operate on its own. However, in the present teachings, such a light assembly may be easily "kitted" for installation or incorporation into the sign cabinet. Based on such modularity, a plurality of light assemblies may be easily interconnected to provide the dual-sided or even multi-sided illumination without needing complicated wiring within the sign cabinet.

For example, opposing light assemblies may be wired in communication to both receive power from an external power source. The opposing light assemblies may be connected relative to each other using a tie bracket. The tie bracket may function to position the light assemblies within the sign cabinet while also providing a structure to secure one or more sections of the sign cabinet. As a result, while the light assemblies could be a standalone unit, in the sign cabinet the light assemblies are integrated with each other to form the dual-sided illumination.

Turning now to the figures, FIG. 1 illustrates a perspective view of a sign cabinet 10 in accordance with the present teachings. The sign cabinet 10 includes a frame 30. The frame 30 may be include one or more sections 32 that form a perimeter of the frame 30 such that one or more graphics 26 may be inserted into the frame 30. The sections 32 may be interconnected or otherwise mounted to form the frame 30. Advantageously, one or more of the sections 32 may also be easily removed to facilitate insertion of the graphics 26 into the confines of the frame 30. Once the graphics 26 are inserted into the frame 30, the one or more sections 32 removes may be once again connected to maintain a position of the graphics 26.

The sign cabinet 10 may be adapted to illuminate the graphics 26 located within the frame 30 using one or more light assemblies (not shown) located within the confines of the frame 30. The light assemblies may be powered by a wire 33 extending from the frame 30 in communication with the light assemblies so that, when a plug 46 of the wire 44 is plugged into a power outlet (not shown), the light assemblies may receive power to illuminate the graphics 26. It should be noted that the wire 44 may be one or more wires adapted to properly transfer power to the light assemblies of the sign cabinet 10. For example, a conventional 3-wire (e.g., hot, neutral, and ground) line may be utilized to facilitate use of most conventional power outlets. To further accommodate powering of the light assemblies, the frame 30 may also include a switch 48 to allow a user to turn one and off the light assemblies.

As illustrates in FIG. 1, the sign cabinet 10 may be freestanding using a removable base 12. The frame 30 may be inserted into a receiving portion 16 of the base 30 so that the frame 30 is positioned in a substantially vertical manner. That is, a height of the frame 30 as measured from the receiving portion 16 to a topmost end of the frame 30 opposing the receiving portion 16 is greater than a width measured transversely across the frame 30 relative to the height. In other words, as shown in FIG. 1, the frame 30 includes two longer vertical sections 32 and two transverse shorter, horizontal sections 32. As such, a height of the frame 30 may be measured along the vertical sections 32 while a width of the frame 30 may be measured along the horizontal sections 32.

To provide additional movability, the receiving portion 16 of the base 12 may be connected to one or more platforms 14 extending transverse to the receiving portion 16. The platforms 14 may include wheels 24, such as casters, that allow for easily moving the sign cabinet 10.

Figure 2:
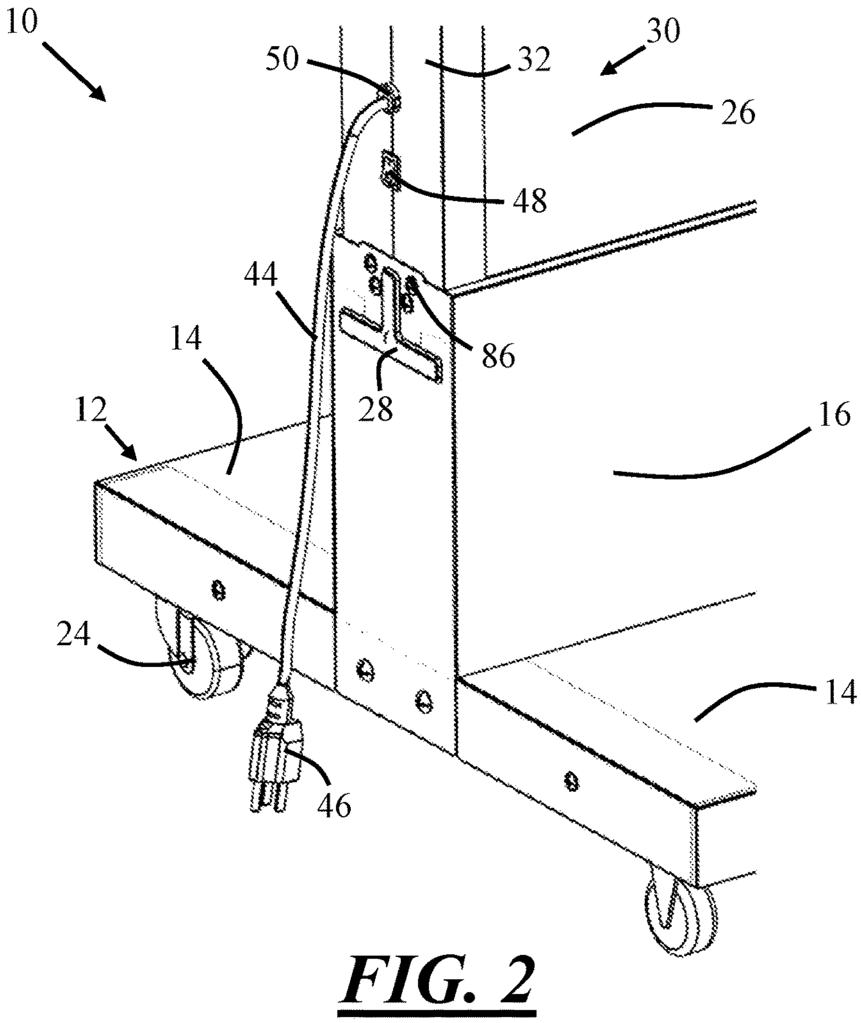
FIG. 2 is a close-up perspective view of a base of a sign cabinet in accordance with the present teachings.

FIG. 2 illustrates a close-up perspective view of the base 12 of the sign cabinet 10 shown in FIG. 1. As discussed above, the base 12 may include a receiving portion 16 projecting from and/or connected to one or more platforms 14 of the base, whereby the platforms 14 include wheels 24 to allow for movement of the base 12, and thus the frame 30. The receiving portion 16 may include a cavity or interior portion that receives a portion of the frame 30 to secure the frame 30 to the base 12. The frame 30, including one or more sections 32 forming the frame 30, may be inserted into the receiving portion 30 and secured to the receiving portion 30 by one or more fasteners 86 extending through the receiving portion 30 into the frame 30. The one or more sections 32 may be fully located within the confines of the receiving portion 16 or may only partially be inserted into the receiving portion 16. Additionally, the receiving portion 16 may also include strengthening beads 28 to increase the structural integrity of the receiving portion 16 to secure the frame 30 in place.

The fasteners 86 securing the frame 30 may extend through one or more walls (e.g., sidewalls, a front wall, a back wall, etc.) of the receiving portion 16 into the frame 30. However, it is envisioned that alternative mounting structures may be utilized to secure the frame 30 into the receiving portion 16. For example, the receiving portion 16 and/or the frame 30 may include one or more mechanical interlocks, such as clips, biasing members, notches, grooves, male and female connectors, etc., that may secure the frame 30. Alternatively, the receiving portion 16 may be sized to facilitate a press-fit condition to engage the frame 30 and secure the frame 30 in place without the need for any secondary fasteners.

Figure 7:
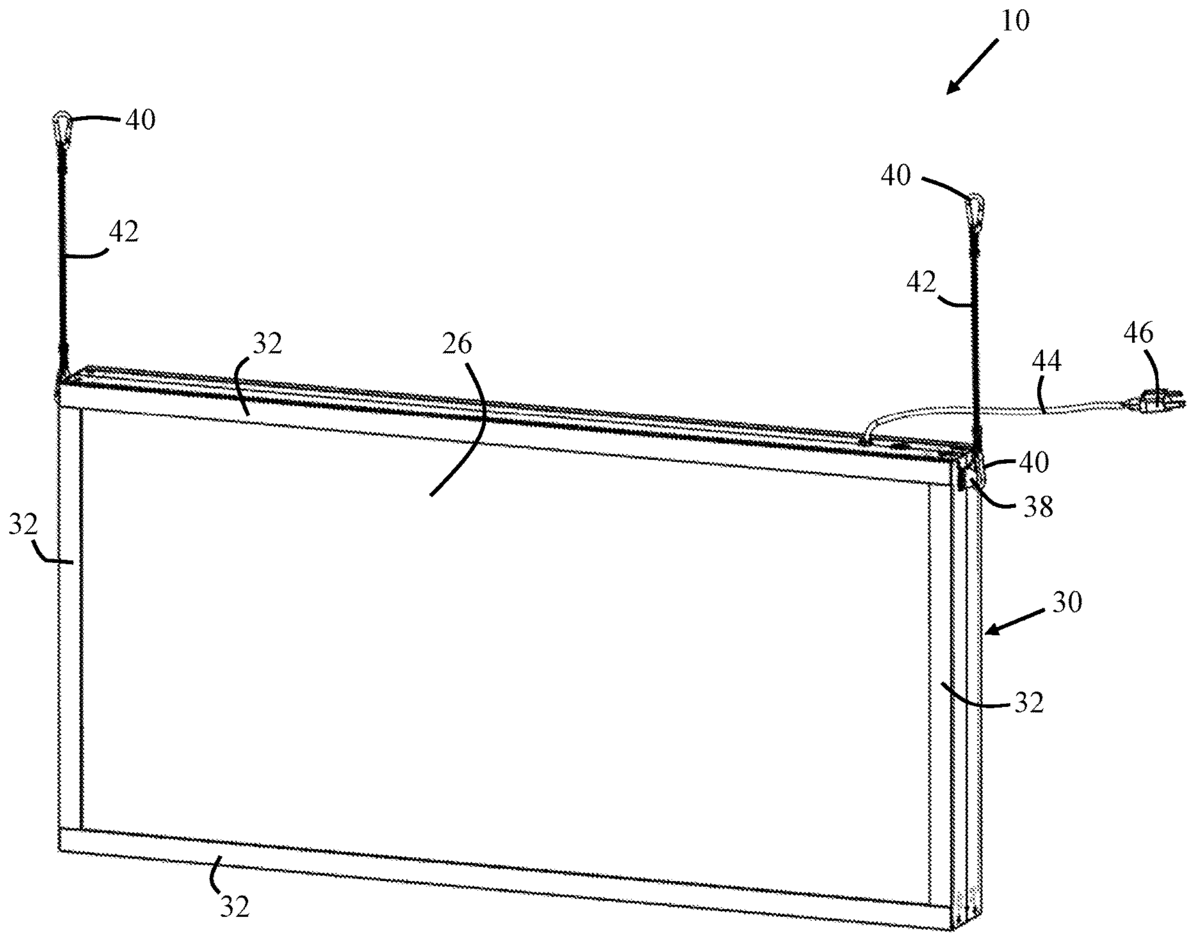
FIG. 7 is a perspective view of the sign cabinet of FIG. 1 with the base removed.

As discussed above, the frame 30 may also include a wire 44 having a plug 46 that extends from a section 32 of the frame 30. The wire 44 may be routed through a grommet 50 located within the section 32 so that the wire 44 may be connected to one or more light assemblies located within the frame 30. As a result, the grommet 50 may seal a hole in the section 32 to prevent moisture and/or debris from entering the confines of the frame 30 through the hole 30. When the plug 46 is connected to a power outlet (not show), a switch 48 located on the section 32 may be turned on to power the light assemblies. Advantageously, the wire 44 and the switch 48 may be positioned along the section 32 of the frame 30 in a manner so that both the wire 44 and the switch 48 remain unobstructed by the base 12. Similarly, the wire 44 and the switch 48 are routed through the frame 30 independent of the base 12 so that the frame 30, including the wire 44 and the switch 48, may be removed from the base 12 and utilized in alternative mounting configurations (e.g., suspended hanging as shown in FIG. 7). As a result, the frame 30 may be quickly and easily removed from the base 12 without any routing or rerouting of wiring necessary to still maintain a fully operation frame for illumination of one or more graphics 26 therein.

Figure 3:
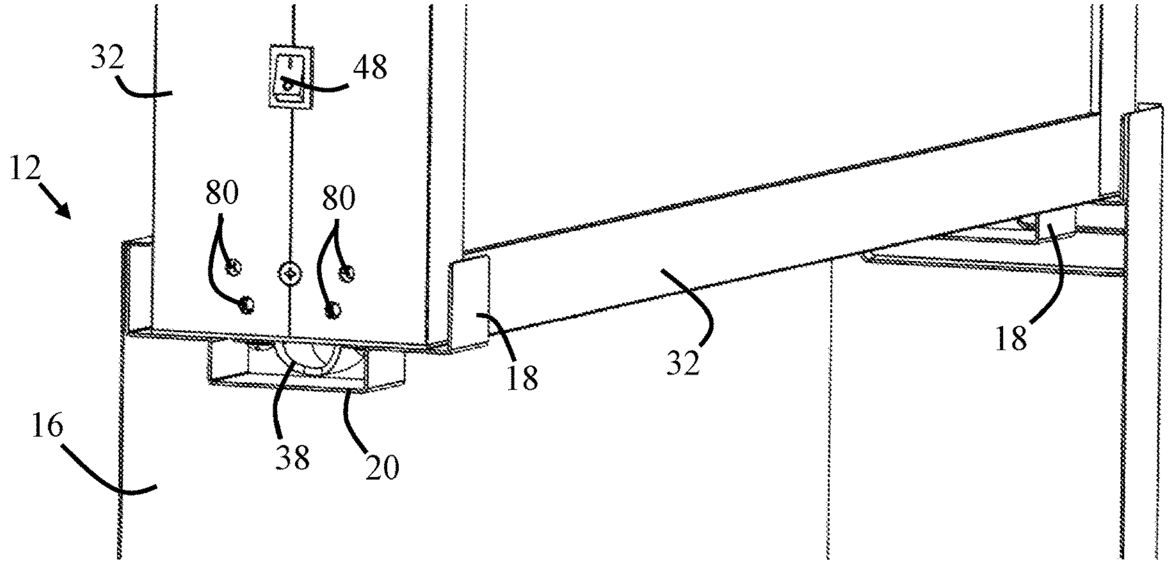
FIG. 3 is a perspective view of the base of FIG. 2 with the receiving portion partially removed.

FIG. 3 illustrates a perspective view of the base 12 shown in FIG. 2 with the receiving portion 16 partially removed to show the interior cavity of the receiving portion. As discussed above, one or more sections 32 of the frame may be partially inserted into the receiving portion 16 without obstructing a wire and a switch 48 located along the frame. The frame is inserted until a portion of the frame (e.g., one or more sections 32) rests against and is supported by a pair of supports 18 located within the receiving portion 16. The supports 18 may maintain a position of the frame within the receiving portion and due to such a configuration, the supports 18 may be located anywhere within the base 12 to accommodate one or more different frame shapes. For example, a taller frame may require further penetration of the frame within the receiving portion 16. As a result, the supports 18 may be located deeper into the receiving portion 16 allow for additional insertion of the frame into the receiving portion 16. Additionally, the support 18 may also include a recess 20 adapted to receive one or more portions of the frame. The recesses 20 may receive a bracket 38 or secondary piece located along the frame to prevent improper seating of the frame within the receiving portion 16. That is, the recesses 20 may receive one or more projections or protrusions along the frame to ensure that the frame sits flush on the supports 18 to prevent rattling of the frame or tilted positioning of the frame. Furthermore, once the frame is successfully inserted, a plurality of fasteners may extend through the receiving portion 18 and into respective base mounting holes 80 located on one or more sections 32 of the frame.

Figure 4:
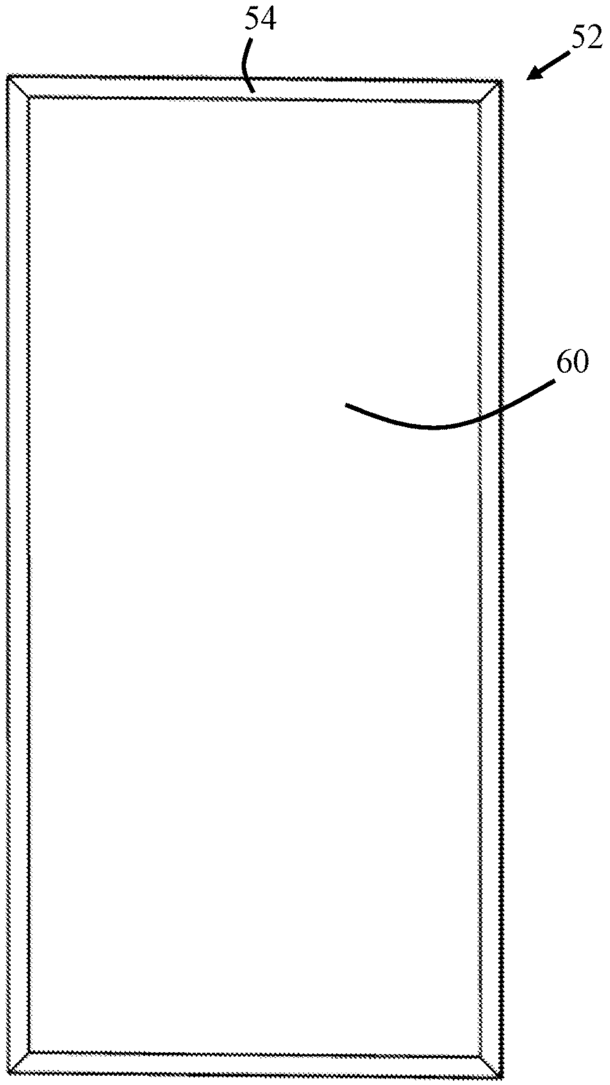
FIG. 4 is a front view of a light assembly in accordance with the present teachings.
Figure 5:
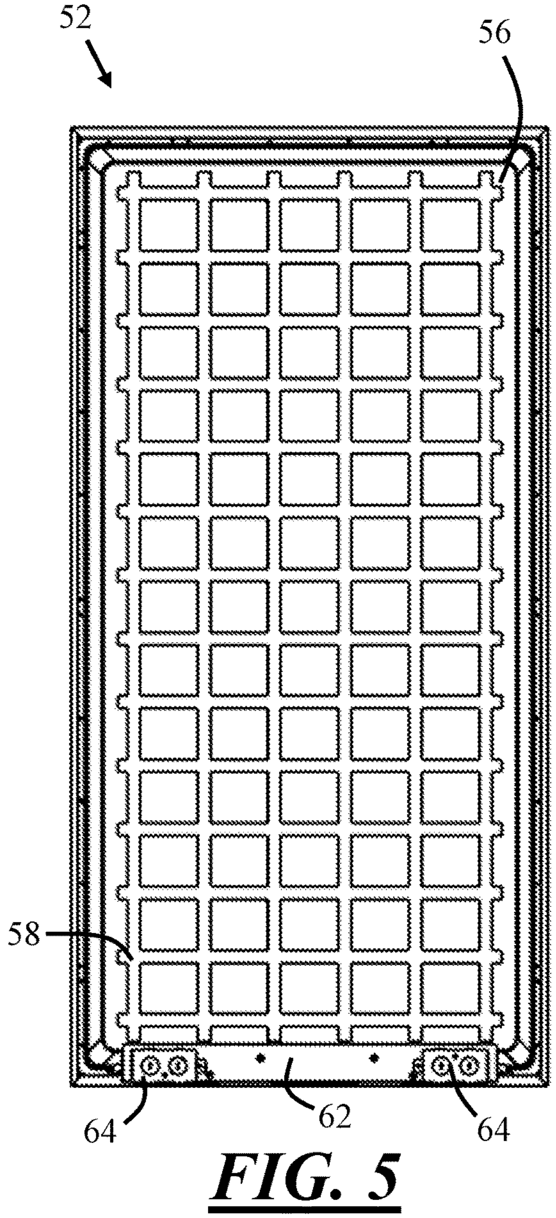
FIG. 5 is a rear view of the light assembly of FIG. 4.

FIGS. 4 and 5 are a front and rear view, respectively, of a light assembly 52 in accordance with the present teachings. It is envisioned that such a light assembly 52 may be incorporated into the sign cabinet as discussed above.

The light assembly 52 may include a light frame 54. As shown, the light frame 54 may extend at least partially or entirely along a perimeter of the light assembly 52 to form an overall shape of the light assembly 52. In this particular case, the light frame 52 may form a substantially rectangular shape which may align with the substantially rectangular shape of the sign cabined illustrated in FIG. 1. However, any shape of the light assembly 52 and/or the sign cabinet may be possible.

The light frame 54 may be located around and/or along a body 56 of the light assembly 52. The body 56 may be adapted to house or otherwise protect one or more components of the light assembly 52. For example, the body 56 may contain one or more light modules 58 adapted to illuminate a graphic located within the sign cabinet. The light module 58 may be a single module 58 or may be a plurality of modules. In particular, it is envisioned that the light module 58 may include one or more light emitting diodes (LEDs). As shown in FIG. 5, the light module 58 may form a grid-like pattern and may be at least partially contained or otherwise connected to the body 56 such that the light module 58 spans a portion or entirety of the body 56 contained within the light frame 54. The LEDs may be distributed along the light module 58 in a uniform or nonuniform manner to optimize illumination of a graphic when the light assembly 52 is installed into the sign cabinet. The graphic may be positioned adjacent to a diffuser 60 of the light assembly 52 located within the light frame 54 so that, as the light module 58 illuminates and the LEDs therein are diffused by the diffuser 60, a graphic located adjacent to the diffuser 60 may be appropriately illuminated for proper visibility.

To control the light module 58, a driver 62 may be located on or in the body 56 of the light assembly 52. The driver 62 may control proper power distribution to the light module 58, may adjust a color temperature of the light module 58, may control and/or monitor one or more other characteristics of the light module 58, or a combination thereof.

Similarly, the driver 62 may be located adjacent to, and in communication with, one or more junction cabinets 64. The junction cabinets 64 may be positioned along the body 56 of the light assembly 52 so that wiring of the light module 58 may be connected to the wiring of the sign cabinet. The junction cabinets 64 may include the wiring of the light module 58 to easily connect the light module 58 to the sign cabinet input wiring so that the light module 58 may receive power through the wiring of the sign cabinet (e.g., through a plug connected to an external power source). As such, the light assembly 52 may beneficially provide an easy and adaptable means for powering the light module 58 through the sign cabinet.

Figure 6:
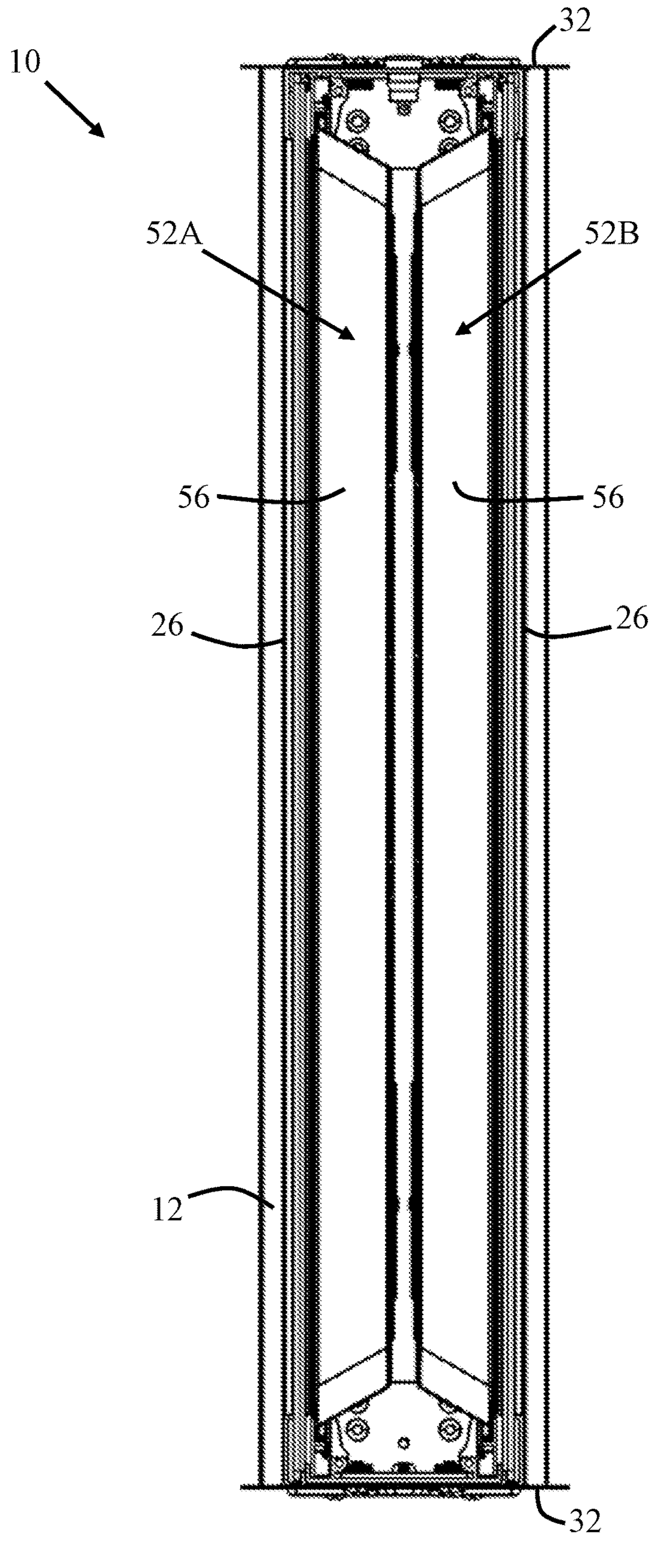
FIG. 6 is a cross-sectional view a sign cabinet in accordance with the present teachings.

FIG. 6 illustrates a cross-sectional view of the sign cabinet 10 in accordance with the present teachings. As discussed above, the sign cabinet 10 may include one or more light assemblies 52. As shown, the sign cabinet 10 may include a first light assembly 52A and a second light assembly 52B. The light assemblies 52A, 52B may abut one another to illuminate opposing sides of the sign cabinet 10. That is, bodies 56 of each light assembly 52A, 52B may abut one another so that illumination of the light assemblies 52A, 52B is guided in opposing directions. Advantageously, such a configuration may allow for graphics 26 located on opposing sides of the sign cabinet 10 within sections 32 of the sign cabinet 10 to be simultaneously illuminated, thereby providing a dual-sided sign cabinet 10. Therefore, the sign cabinet 10 may be secured to the base 12 and positioned in a manner that allows for an increased area of visibility.

While simultaneous illumination of both sides of the sign cabinet 10 may be possible utilizing the aforementioned structure, it is also envisioned that each light assembly 52A, 52B may also be adapted for independent use from one another. For example, the first light assembly 52A may allow for independent illumination when the second light assembly 52B is turned off, or vice versa. While powering of both light assemblies 52A, 52B may be received from a common power source, the drivers within the light assemblies 52A, 52B (see FIG. 5) may facilitate various operating conditions to further customize the sign cabinet based on user needs.

FIG. 7 illustrates a perspective view of the sign cabinet 10 of FIG. 1 with the base removed. Advantageously, the sign cabinet 10 may allow for easy removal from the base to accommodate different mounting techniques, such as suspended hanging of the sign cabinet 10. As such, the sign cabinet 10 may allow for both freestanding (e.g., using the base) and suspending hanging using one or more cords 42 and/or clips 40 to secure the sign cabinet 10 from a structure (e.g., ceiling, rafter, beam, roof, etc.).

Suspended hanging of the sign cabinet 10 may also allow for substantially horizontal hanging, whereby a height of the frame 30 of the sign cabinet 10 as measured along upright sections 32 is less than a width of the frame 30, as measured transverse to the height (e.g., along the sections 32 extending between the cords 42). As such, it may be gleaned from the present teachings that the sign cabinet 10, in combination with the suspended hanging and/or base, may allow for both vertical and/or horizontal freestanding, suspended hanging, or both.

As discussed above, the sign cabinet 10 may include a plurality of interconnected sections 32 that may receive and hold in place a graphic 26. The graphic 26 may abut a diffuser of a light module so that the light module may properly illuminate the graphic 26. To accommodate suspended hanging of the sign cabinet 10 without obstructed the graphic 26 located therein, the sign cabinet 10 may include one or more brackets 38 mounted along a perimeter of the sign cabinet 10. The brackets 38 may be secured directly to the sections 32 or may be positioned adjacent to the sections 32. The brackets 38 may also be adapted to receive a clip 40 connected to the cord 42 to allow for the suspended hanging.

Advantageously, the wire 44 and the plug 46 of the sign cabinet 10 may be routed away from or otherwise free of connection with the base shown in FIG. 1. As a result, the sign cabinet 10 may be easily disconnected from the base by removing one or more fasteners (see, e.g., FIGS. 2 and 3) without needing to remove the wire 44 and/or plug 46 from the base. Therefore, the wire 44 and plug 46 may allow for both freestanding and suspended hanging of the sign cabinet 10 without the need for additional wiring adjustments.

Figure 8:
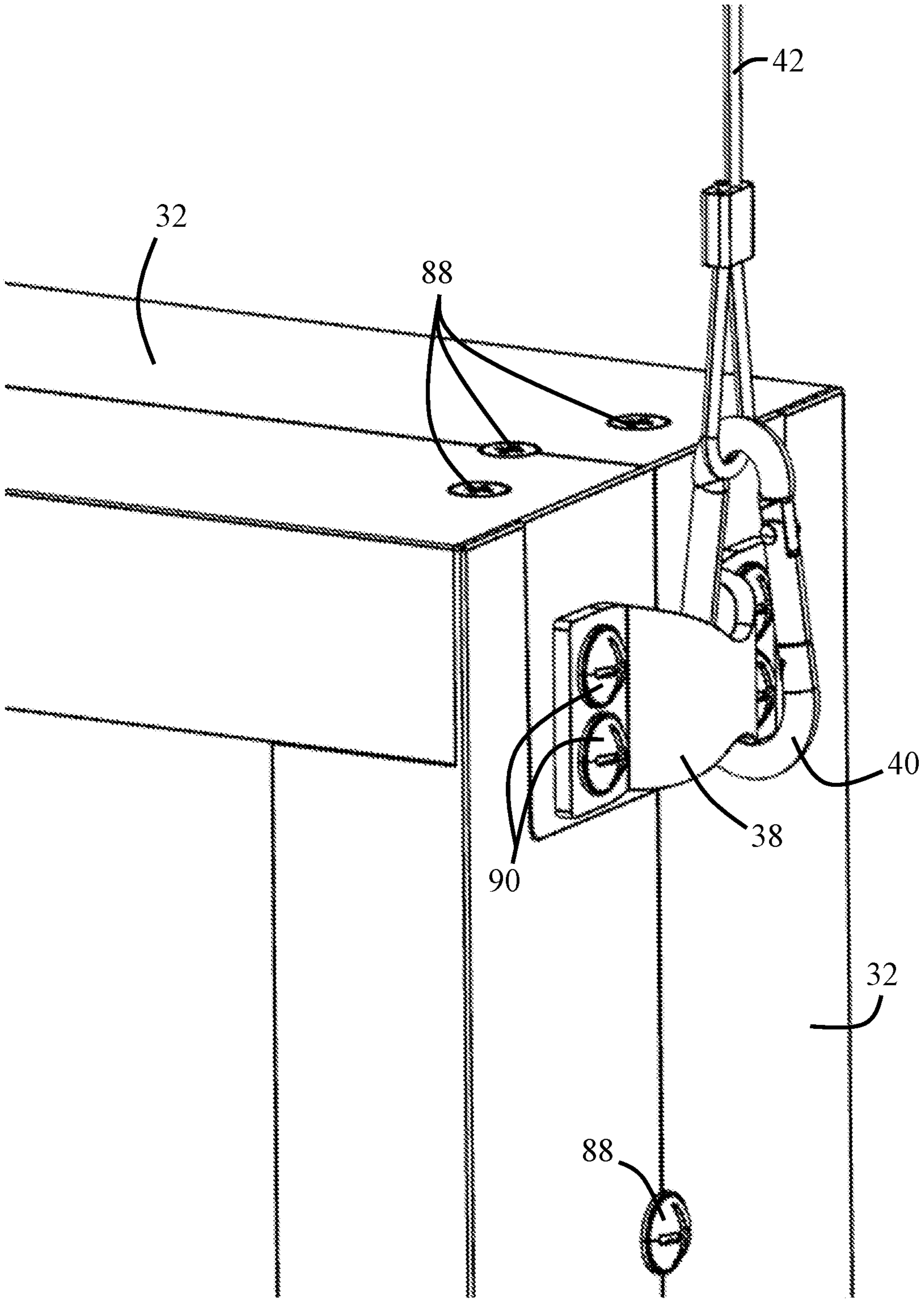
FIG. 8 is a close-up perspective view of the sign cabinet of FIG. 7.

FIG. 8 illustrates a close-up perspective view of the sign cabinet 10 shown in FIG. 7. As discussed above, the sign cabinet 10 may include one or more brackets 38 that to accommodate suspended hanging of the sign cabinet 10. The bracket 38 may receive a clip 40 connected to a cord 42 to support the weight of the sign cabinet 10 when hung. The bracket 38 may be secured to the sign cabinet 10 by one or more fasteners 90 extending through the bracket 38 and into the sign cabinet 10. Beneficially, the bracket 38 may be positioned in manner that does not obstruct mounting of the sections 32 of the sign cabinet 10 by one or more fasteners 88.

Figure 9:
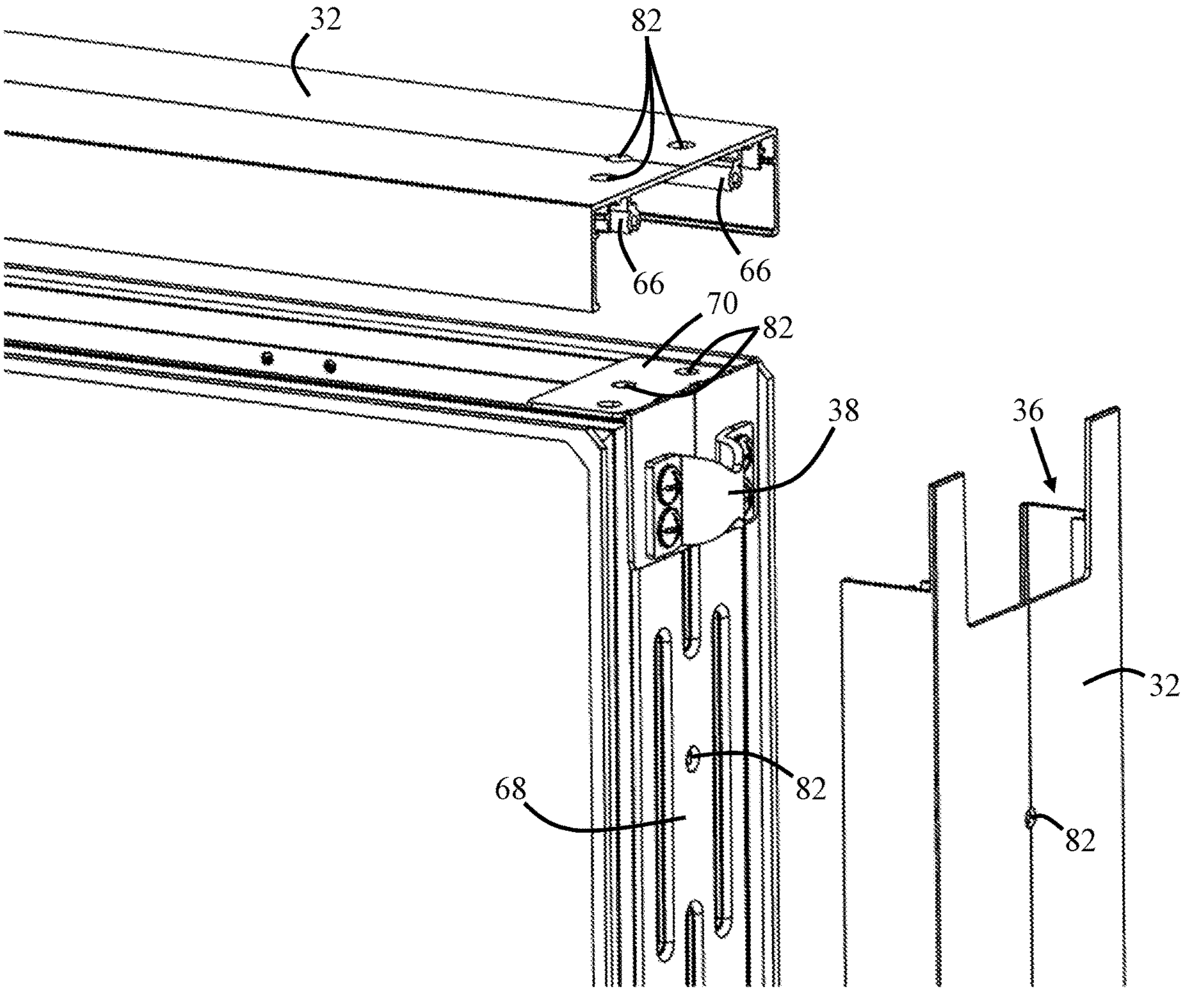
FIG. 9 is a partially exploded view of FIG. 8.

FIG. 9 illustrates an exploded view FIG. 8, with the sections 32 being removed from the sign cabinet. The sign cabinet may include a tie bracket 68 located therein. The tie bracket 68 may be adapted to interconnect the light modules located within the sign cabinet. Additionally, the tie bracket 68 may include one or more mounting holes 82 adapted to secure one or more of the sections 32 by aligning the mounting holes 82 of the tie bracket 68 with mounting holes 82 along the section to receive a fastener therein.

Similarly, the sign cabinet may also include one or more secondary brackets 70 that have mounting holes 82 to secure one or more sections 32 in a similar manner to the tie bracket 68. As a result, substantially all or an entirety of a perimeter of the sign cabinet may be covered and/or defined by the sections 32. Furthermore, it should also be noted that one or more of the sections 32 may include one or more channels 62 positioned within the confines of the sign cabinet to receive one or more fasteners and further secure the sections 32 and sign cabinet together.

The bracket 38 of the sign cabinet that accommodates suspended hanging may also be secured to the tie bracket 68, the second bracket 70, or both. However, the bracket 38 may be positioned within a cutout 36 of the section 32 so that the section 32 may be secured and/or removed from the tie bracket 68 without having to remove the bracket 38.

ELEMENT LIST

10 Sign Cabinet
12 Base
14 Platform
16 Receiving Portion
18 Support
20 Recess
24 Wheel
26 Graphic
28 Strengthening Bead
30 Frame
32 Section
36 Cutout
38 Bracket
40 Clip
42 Cord
44 Wire
46 Plug
48 Switch
50 Grommet
52 Light Assembly
52A First Light Assembly
52B Second Light Assembly
54 Light Frame
56 Body
58 Light Module
60 Diffuser
62 Driver
64 Junction Cabinet
66 Channel
68 Tie Bracket
70 Secondary Bracket
80 Base Mounting Hole
82 Section Mounting Hole
84 Bracket Mounting Hole
86 Base Fastener
88 Section Fastener
90 Bracket Fastener Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time, and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference in their entireties for all purposes. The term "consisting essentially of" to describe a combination shall include the elements, ingredients, components or steps identified, and such other elements, ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference herein in their entirety for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A sign cabinet, comprising:

(a) a frame adapted to receive and support one or more graphics, the frame having sections defining a perimeter of the frame; and (b) a light assembly housed within the frame and adapted to illuminate the one or more graphics when located within the frame;

wherein the frame is adapted for freestanding and suspended hanging;

wherein one or more of the sections include a cutout having a perimeter that at least partially extends around a bracket for hanging located along the frame.

2. The sign cabinet of claim 1, wherein the sign cabinet includes a first light assembly abutting a second light assembly, and the first light assembly illuminates a first side of the frame while the second light assembly illuminates an opposing second side of the frame.

3. The sign cabinet of claim 2, wherein the frame is adapted to receive and support a first graphic on the first side of the frame and a second graphic on the second side of the frame.

4. The sign cabinet of claim 3, wherein each light assembly comprises:

(a) a body;

(b) a light module having one or more light emitting diodes (LEDs) disposed in a grid-like pattern and contained within the body; and (c) a diffuser located adjacent to the light module, wherein the diffuser is adapted to abut the one or more graphics and diffuse light emitted from the light module to illuminate the one or more graphics.

5. The sign cabinet of claim 4, wherein a body of the first light assembly abuts a body of the second light assembly so that a diffuser of the first light assembly is free of contact with a diffuser of the second light assembly.

6. The sign cabinet of claim 4, wherein each light assembly includes a driver in communication with the light module.

7. The sign cabinet of claim 5, wherein the first light assembly and the second light assembly are secured to one another by a tie bracket.

8. The sign cabinet of claim 7, wherein one or more of the sections are secured directly to the tie bracket.

9. The sign cabinet of claim 7, wherein the body of the first light assembly and the body of the second light assembly are fully contained within the confines of the frame of the sign cabinet.

10. The sign cabinet of claim 9, wherein the sign cabinet is adapted for freestanding in a vertical position and suspended hanging in a horizontal position.

11. The sign cabinet of claim 3, wherein one or more of the sections are detachable from the frame to provide an opening for inserting the one or more graphics into the frame.

12. The sign cabinet of claim 11, wherein the bracket is located around the perimeter of the frame adapted to secure a cord for hanging the sign cabinet.

13. The sign cabinet of claim 12, wherein the sign cabinet includes a removable base having a receiving portion that receives the sign cabinet and facilitates freestanding of the sign cabinet.

14. The sign cabinet of claim 13, wherein the base includes a platform extending substantially transverse from the sign cabinet, and the platform includes one or more casters.

15. The sign cabinet of claim 14, wherein the receiving portion projects from and extends substantially transverse from the platform to receive the sign cabinet.

16. The sign cabinet of claim 15, wherein the frame of the sign cabinet is supported by a support located within a cavity of the receiving portion, and the frame is secured to the receiving portion by one or more fasteners.

17. The sign cabinet of claim 16, wherein the support of the receiving portion includes a recess that receives the bracket of the frame.

18. The sign cabinet of claim 16, wherein the sign cabinet includes a wire that is adapted to receive power from a power outlet, and the wire extends from the frame of the sign cabinet in a location that is free of contact with the base when the sign cabinet is inserted into the base.

19. A sign cabinet, comprising:

(a) a frame having removable sections defining a perimeter of the frame; and (b) a first light assembly and an opposing second light assembly located within the perimeter of the frame and secured to one another by a tie bracket located within the frame, wherein the first light assembly is adapted to illuminate a first graphic located on a first side of the sign cabinet and the second light assembly is adapted to illuminate a second graphic on an opposing second side of the sign cabinet, the first graphic and the second graphic both being contained within the frame;

wherein the sign cabinet includes a removable base to facilitate freestanding of the sign cabinet, and the sign cabinet also includes one or more brackets located along the frame to facilitate suspended hanging of the sign cabinet by one or more cords.

* * * * *